No. 829,664. PATENTED AUG. 28, 1906.
H. MEHNER.
PROCESS OF SOLIDIFYING EARTHY GROUND.
APPLICATION FILED MAY 17, 1906.
3 SHEETS—SHEET 1.
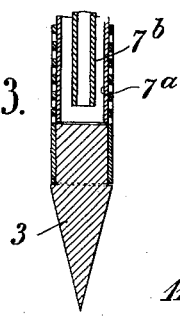
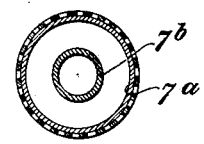
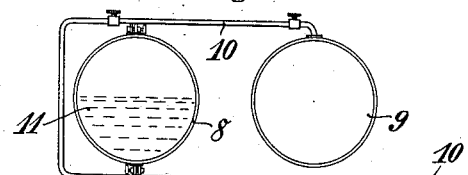
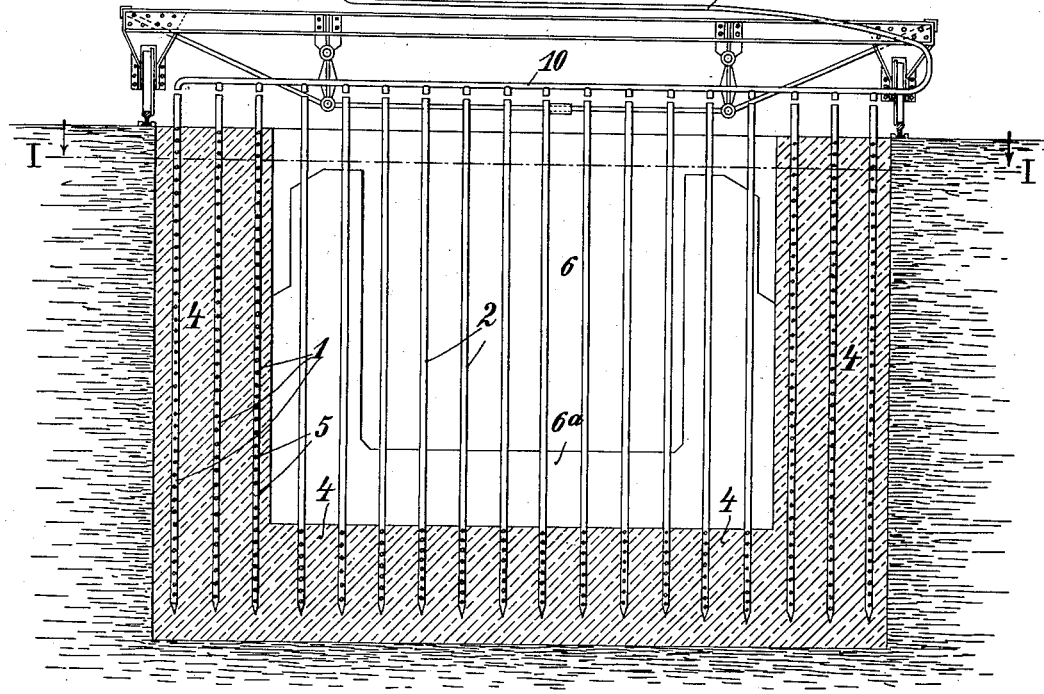
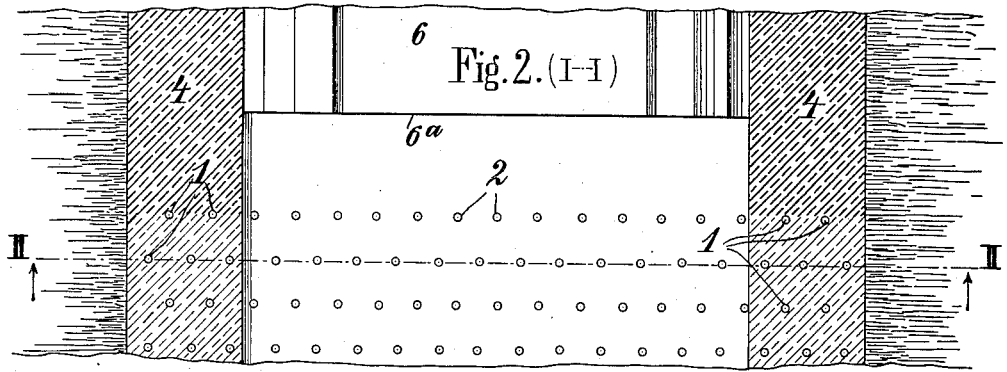
Witnesses:
A. L. O'Brien
Herman Morris
Inventor
HERMANN MEHNER
by
Dickerson, Brown, Raegener & Binney
Attys No. 829,664. PATENTED AUG. 28, 1906.
H. MEHNER.
PROCESS OF SOLIDIFYING EARTHY GROUND.
APPLICATION FILED MAY 17, 1906.

3 SHEETS—SHEET 2.

(VI—VI)

(V—V)

Witnesses:
A. L. O'Brien
Herman Morris

Inventor
HERMANN MEHNER
by
Dickerson, Brown, Raegener & Binney
Attys

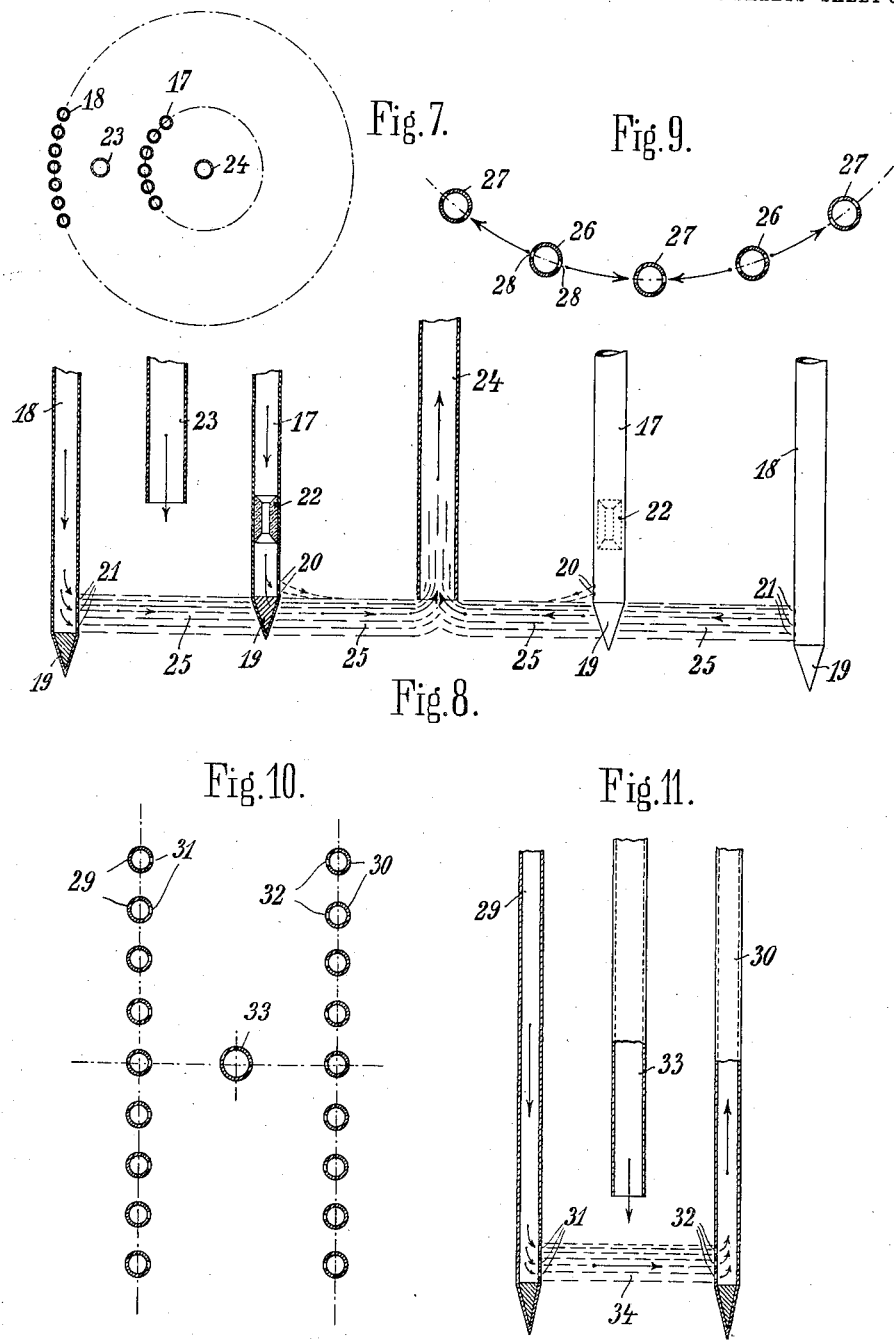

UNITED STATES PATENT OFFICE.

HERMANN MEHNER, OF FRIEDENAU, NEAR BERLIN, GERMANY.

PROCESS OF SOLIDIFYING EARTHY GROUND.

No. 829,664.   Specification of Letters Patent.   Patented Aug. 28, 1906.

Application filed May 17, 1906. Serial No. 317,254.

*To all whom it may concern:*

Be it known that I, HERMANN MEHNER, chemist, a citizen of the German Empire, and a resident of Friedenau, near Berlin, Germany, have invented certain new and useful Improvements in Processes of Solidifying Earthy Ground, of which the following is a specification.

In constructing shafts for mines, tunnels, and also in erecting buildings difficulties are oftentimes experienced resulting from muddy ground or from quicksand.

My invention relates to a method of doing away with these difficulties by solidifying the muddy ground or quicksand or the like by introducing mineral substances in liquid condition which have the property of becoming solid on cooling.

In the following specification and claims I wish it to be understood that mineral substance in liquid condition does not only cover true liquids, but also masses of semiliquid, tough, or paste-like condition.

The principal object of the invention consists in confining the mineral substances which are introduced into the earthy ground within certain predetermined limits. This is done by making provisions for carrying away heat from the ground space which it is intended to solidify. This may be done either by heating the ground which it is intended to solidify by suitable heaters or by providing cool surfaces at the borders of the said ground portion.

Furthermore, my invention consists in means for effecting the heating of the ground portion which it is intended to solidify and in means to produce a cooling of the earthy ground at the borders of the ground portion to be solidified.

Further objects of my invention consist in the selection of suitable substances adapted to become solid on cooling after introduction into the earthy ground.

Further objects of the invention will become clear from the following specification with reference to the annexed drawings.

Figure 5:
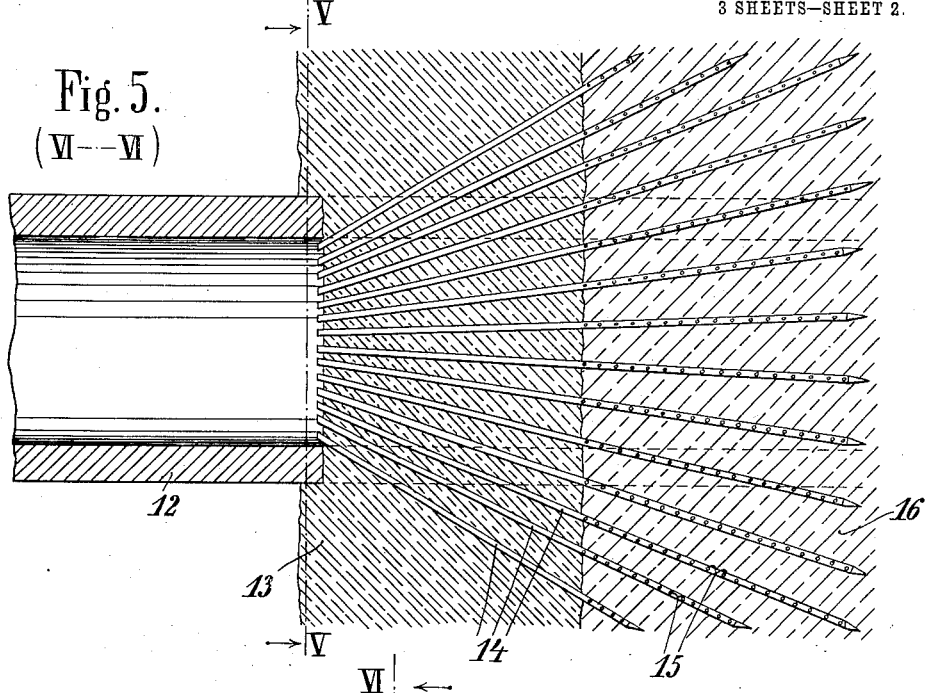
Figure 6:
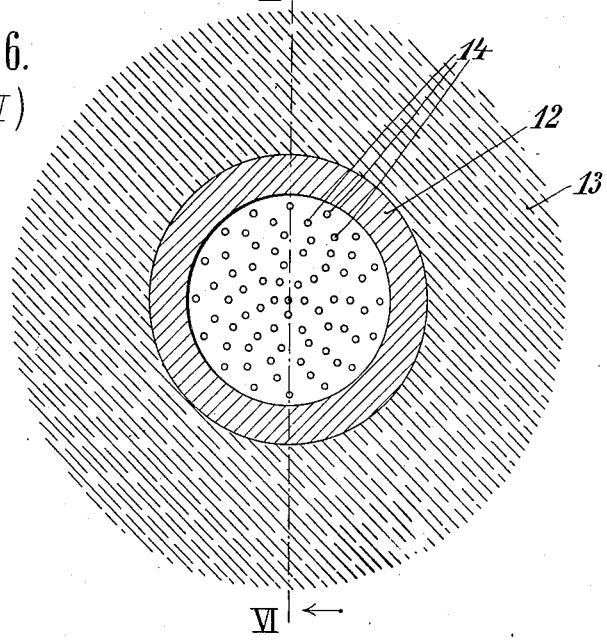

In the drawings, Figure 1 is a vertical section through an arrangement which may be used for forming solid walls of a channel. Fig. 2 is a plan of the arrangement shown in Fig. 1. Fig. 3 is a longitudinal section through a part of a tube adapted to heat the earthy ground and at the same time to introduce mineral liquid into the ground. Fig. 4 shows, on a larger scale, a horizontal section through the tube of Fig. 3. Figs. 5 and 6 illustrate in longitudinal and in vertical section the construction of a tunnel in accordance with the invention. Fig. 7 shows diagrammatically an arrangement for constructing a shaft for a mine. Fig. 8 shows, on a larger scale, the arrangement of Fig. 7 in vertical section. Fig. 9 shows diagrammatically a side elevation of a tube arrangement for the formation of low temperature. Figs. 10 and 11 show in horizontal section and in side elevation, partly in vertical section, an arrangement for the formation of horizontal plates of stony material within the earthy ground.

In the arrangement shown in Figs. 1 to 4 the numerals 1 and 2 designate tubes which are provided with perforations. The tubes 1 2 are shown as provided with solid points 3 in order to enable same to be driven into the earthy ground 4. The tubes 1 2 are provided with perforations 5, said perforations being limited to those parts of the tubes which are to be inserted into earthy ground which it is intended to solidify. For this reason the perforations 5 of the tubes 1 are provided on a greater length of the tubes than the perforations of the tubes 2 which penetrate the cross-section 6 of the channel to be formed. The tubes 1 and 2 are provided with inner tubes 7$^a$ and 7$^b$. The several tubes 1 2 are connected to receptacles or tanks 8 9 by tubes 10. The tank 8 is filled with mineral liquid 11, adapted to become solid on cooling. The vessel 9 is a steam-boiler.

The operation of the above-described device is as follows: After insertion of the tubes 1 2 into the earthy ground and connection of said tubes with tubes 10, adapted to communicate with tank 8 and boiler 9, steam is pressed into tubes 1 2. The steam heats the tube-walls and finding the perforations 5 of the tubes 1 and 2 closed by tubes 7$^a$ returns to tubes 7$^b$. Through tubes 7$^b$ also water of condensation is drawn off. The heat of the steam is in this way communicated to the earthy ground by simple contact of the ground with the tubes and conductivity of heat. The whole ground 4 which it is intended to solidify being provided with tubes 1 2, arranged in proximity to each other, the heating of the ground is effectively secured and at the same time limited to that ground portion which is to be acted upon. When the earthy ground is sufficiently heated, the admission of steam is interrupted and tubes 7ᵃ and 7ᵇ removed from the tubes 1 2. Now mineral liquid 11 is sent from the tank 8 through the tubes 1 2 and passes through the perforations 5 of the tubes 1 2 and impregnates the heated ground. On advancing through the heated ground the mineral liquid finally arrives at the borders of the heated ground portion. As soon as this occurs the mineral liquid becomes solid, so that at the borders of the heated ground portion a solid wall is formed which prevents further advancing of the mineral liquid. In this way the impregnating and solidifying of the earthy ground is limited to those portions of the earthy ground which inclose the perforated portion of the heating-tubes 1 2 and which are heated by such tubes. When sufficient mineral liquid has been sent through the tubes 1 2 into the earthy ground, the tubes are drawn out and the ground left to cool. A further portion of the ground may then be treated in the same manner. The earthy material inclosed by the solid walls produced in the above-mentioned manner may be dug out when the encircling walls have hardened.

The solidity of the walls formed by the hardening of the mineral liquid introduced into the earthy ground may be raised by additional walls from suitable material. In the drawings such additional walls are indicated and designated 6ᵃ. As mineral liquids suitable for being used may be mentioned gypsum-containing liquids. The fitness of such mineral liquids depends chiefly on the fact that gypsum loses water of hydration when it is heated up to a temperature of about 107° centigrade. By such losing of water of hydration the gypsum is changed from solid condition to liquid or semiliquid or paste-like condition. On cooling, the gypsum combines again with the water of hydration driven off by heating and forms a solid material. The minerals which become liquid by losing of water of hydration when being heated may be intermixed with other substances adapted to depress the temperature at which the mineral liquid becomes solid on cooling. The addition of such substances is advisable in order to avoid inconvenient heating of the earthy ground which is to be solidified by impregnating with mineral liquid. Substances adapted to depress the temperature at which gypsum converted into molten condition by heating becomes solid on cooling are chlorid of magnesium and chlorid of sodium. Instead of hydrated gypsum also burnt gypsum may be used, especially in mixture with chlorid of magnesium. This depends on the fact that burnt gypsum, especially in mixture with chlorid of magnesium, hardens very slowly at elevated temperature, but quickly at ordinary temperature. Besides, those mineral liquids which harden by hydration of the minerals contained therein other mineral liquids may be used—for instance, substances which have the property of becoming solid on cooling without melting on heating up to temperatures which are to be considered under practical conditions. Other substances which are fit for the purpose are substances such as bitumen or other kinds of pitch and sulfur which have the property of melting on heating without undergoing a chemical conversion and which become solid again on cooling. The same substances which were just now mentioned may be used in connection with the mechanical device represented in Figs. 5 and 6. These figures illustrate the execution of the invention in connection with the construction of a tunnel. It is assumed that a part of the tunnel is finished by some suitable method. This part is designated with the numeral 12. In front of the finished end of the tunnel there is a solid wall 13, securing the tunnel against water which is contained in the earthy ground. This solid wall 13 is crossed by tubes 14, radiating from the front end of the finished tunnel. The tubes 14 are provided with holes 15 at the ends which are most remote from the front end of the tunnel. The construction of the tubes 14 may be the same as that of the tubes 1 2. (Represented in Figs. 1 to 4.)

The described mechanical arrangement is used in the same way as that illustrated in Figs. 1 to 4. The tubes 14 therefore are connected at first with a steam-boiler, so as to heat the earthy ground 16 in front of the finished tunnel end. The heating being finished, mineral liquid having the property of becoming solid on cooling is pressed into the ground 16 through the holes 15 of the tubes 14, so that the ground 16 in front of the wall 13 is impregnated with such mineral liquid. Hereafter the tubes are withdrawn and the ground left to cool. In this way a solid wall in front of the wall 13 is formed. This solid wall now forms protection for the front end of the tunnel 12, so that such front end may be advanced through the wall 13. Hereafter the tubes 14 are again driven through the wall 16 into earthy ground in front of the said ground portion 16 in order to solidify also such ground portion.

The arrangement shown in Figs. 7 to 10 is especially adapted to carry away heat from the borders of the ground portion which it is intended to solidify not only by simple conductivity, but also by transmission. This is done by providing cooling-surfaces at such borders.

The arrangement of Figs. 7 and 8 is an arrangement for producing a vertical shaft—for instance, of a mine. In this instance the ground portion inclosing the space for the shaft is encircled by rows of tubes 17 18, concentric to each other and to the center of the shaft to be formed. The tubes 17 18 are provided with solid points 19 and with openings 20 21 near said solid points. The tubes 17 are provided with channeled stoppers 22 from heat-insulating material. 23 is a tube arranged between the two rows of tubes 17 18, and 24 is a tube arranged substantially in the center of the rows of tubes 17 18. Assuming that the tubes 17, 18, 23, and 24 have been driven into the earthy ground in such a manner that the tubes 17 are placed at the inner border of the shaft to be formed and the tubes 18 at the outer border of the shaft-wall to be formed, then liquid of suitable temperature is driven through tubes 17 and 18 and exhausted or sucked through tube 24. If this is done, a stream of liquid 25 is produced, running within the earthy ground from the holes 20 21 of tubes 17 18 to the lower opening of tube 24. At the same time the rows of tubes 17 18 form cooling-surfaces, inclosing the earthy ground which it is intended to solidify for formation of a solid wall for the shaft. Through the tube 23 mineral liquid is introduced, having the property of becoming solid on cooling down to the temperature of the water which is driven through the tubes 17 and 18. The mineral liquid introduced through the tube 23 hardens on reaching the cold current of liquid 25 and the surfaces of the tubes 17 and 18. In this way the mineral liquid is prevented from leaving that earthy ground portion which it is intended to solidify for forming a wall for the shaft. Only at one place the mineral liquid has an opportunity to escape through the slits of the inner tubes 17—namely, at those places of the tubes which are protected by the heat-insulating rings 22. At these places the mineral liquid may flow through the slits between the tubes 17, because at these parts of the tubes the heat is not carried away with sufficient velocity. The mineral liquid passing through the slits of the tubes 17 at the said places is prevented by the cold current of liquid 25 at the bottom of the room inclosed by the tubes 17 from sinking down below such cold current of liquid. The mineral liquid becomes solid on contact with the said cold current of liquid and forms the bottom of the shaft. After the formation of the shaft-bottom the tube 23 is gradually raised, and in this way ground portions in higher levels are impregnated with mineral liquid, so as to form the shaft-wall in progress from the bottom to the top. In this instance heat from the mineral liquid is carried away by moving cooling liquid. Therefore a quick hardening of the mineral liquid at the cooling-surfaces may be obtained, even if the temperature of the cooling liquid is relatively high, because the mineral liquid is prevented by the current of cooling liquid to gradually raise the temperature of the ground with which it is in contact.

Instead of arranging the tubes 17 18 so closely together that the spaces between the tubes are sufficiently cooled down by the cooling action the tubes may be provided with lateral openings, as indicated in Fig. 9. In this figure the tubes are designated 26 27 and the lateral openings 28. In this instance it is of course necessary to use the tubes partly for introducing the liquid and partly for exhausting. In the drawings the introducing-tubes are designated 26 and the exhausting-tubes 27. Arrows indicate the direction of the currents of liquid.

In the arrangement shown in Figs. 10 and 11 two rows of tubes 29 and 30 are indicated arranged in straight lines opposite each other. The tubes 29 are provided with holes 31 and the tubes 30 with holes 32, the holes being arranged in such a manner that same are arranged opposite each other. 33 is a tube arranged between the two rows of tubes 29 30. Assuming the tubes 29, 30, and 33 being driven into the earthy ground, then cool water is introduced into tubes 29 and exhausted through tubes 30. This cool water forms current of liquid within the ground between the tube-openings 31 32. If now mineral liquid adapted to become solid on cooling is introduced through the tube 33, then this mineral liquid will impregnate the earthy ground above the cool current of liquid 34 and will harden on contact with said cool current of liquid. In this way it becomes possible to form a horizontal plate of stony material, as may be desirable especially in erecting buildings on muddy ground. It is a matter of course that even in those instances in which the ground portion which it is intended to solidify is inclosed between cooling-surfaces a heating of the ground portion to be acted upon may be effected in some distance from the cooling-surfaces in order to secure a quicker impregnation of the ground with mineral liquid. Instead of impregnating the ground with mineral liquid also a substitution of the ground by mineral liquid may take place. In this instance the space which it is intended to be filled up with hardening mineral liquid must gradually be removed, according to the advancing mineral liquid.

Having now particularly described and ascertained the nature of my invention and in what manner the same is to be performed, I declare that what I claim is—

1. Process of solidifying earthy ground consisting in providing means at the borders of the ground portion which it is intended to solidify adapted to carry away heat from the said ground portion and introducing into the ground which is to be solidified a mineral substance in liquid condition adapted to become solid on cooling.

2. Process of solidifying earthy ground consisting in heating the ground portion which it is intended to solidify and then introducing a mineral substance in a liquid condition adapted to become solid by cooling on reaching the border of the heated ground portion.

3. Process of solidifying earthy ground consisting in heating the ground portion which it is intended to solidify and then introducing into said ground portion a mineral liquid containing at least one salt having the property of being solid at ordinary temperature and of losing water of hydration on heating before reaching the temperature up to which the earthy ground had been heated and leaving the impregnated earthy ground for cooling.

4. Process of solidifying earthy ground consisting in bringing heating devices into contact with the body of the earthy ground to be acted upon, such heating devices being adapted to heat the ground surrounding same by contact of the ground with the surfaces of the heaters and introducing a mineral substance in liquid condition after suitable heating of the ground said mineral liquid adapted to become solid by cooling down to ordinary temperature of the ground.

5. Process of solidifying earthy ground consisting in inserting tubes into the ground to be solidified, heating the walls of the tubes till the ground is heated to suitable temperature by contact with the walls of said heated tubes and impregnating the heated ground portion with mineral liquid adapted to become solid on cooling to ordinary ground temperature.

6. Process of solidifying earthy ground consisting in introducing tubes into the earthy ground to be acted upon, the tubes being provided with perforations in that part which is inserted into the said ground portion and containing inner tubes closing the perforations, introducing at first steam into said tubes or part of same so as to heat the earthy ground by contact with the walls of said tubes, removing thereafter the inner tubes closing the perforations of the outer tubes and introducing finally a mineral liquid having the property of becoming solid when cooled down to the ordinary temperature of the ground.

7. Process of solidifying earthy ground consisting in providing means at the borders of the ground portion which is to be solidified adapted to carry away heat and introducing into the ground portion which is to be solidified a mineral substance in liquid condition adapted to become solid when being cooled, said mineral liquid containing at least one salt having the property of losing water of hydration on heating and of recombining with same on cooling and at the same time one or more substances adapted to depress the point of temperature at which the water of hydration leaves the molecule of the said salt.

8. Process of solidifying earthy ground consisting in heating the ground portion to be acted upon, introducing a gypsum-containing mineral liquid into the heated ground portion and then leaving the impregnated material for cooling.

9. Process of solidifying earthy ground consisting in heating the ground portion to be acted upon above the temperature at which gypsum (sulfate of calcium) becomes liquid, introducing a gypsum-containing mineral liquid into the heated ground portion and then leaving the impregnated material for cooling.

10. Process of solidifying earthy ground consisting in heating the ground portion to be acted upon, introducting into the heated ground portion a mineral liquid containing gypsum and substances adapted to depress the melting-point of the gypsum and then leaving the impregnated material for cooling.

11. Process of solidifying earthy ground consisting in heating the ground portion to be acted upon, introducing into the heated ground portion a mineral liquid containing gypsum and chlorid of magnesium and then leaving the impregnated earthy ground for cooling.

12. Process of solidifying earthy ground consisting in heating the ground portion to be acted upon, introducing into the heated ground portion a mineral liquid containing a mixture of burnt gypsum and of a solution of chlorid of magnesium.

13. Process of solidifying earthy ground consisting in providing wall members at the borders of the ground portion which is to be solidified, said wall members being adapted to carry away heat and introducing into the ground portion intermediate the cooling wall members mineral liquid which has the property of becoming solid on cooling.

14. Process of solidifying earthy ground consisting in providing wall members at the borders of the ground portion which is to be solidified, said wall members being adapted to carry away heat, introducing into the ground portion intermediate the cooling wall members mineral liquid which has the property of becoming solid on cooling down and removing at the same time the ground material from the space intermediate the cooling wall members.

15. Process of solidifying earthy ground consisting in providing wall members at the borders of the ground portion which is to be solidified, said wall members being adapted to carry away heat and at least partly consisting of currents of liquid and introducing into the ground portion intermediate the cooling wall members mineral liquid which has the property of becoming solid on cooling.

16. Process of solidifying earthy ground consisting in introducing water or aqueous liquid into the ground along a line forming a border of the ground portion which it is intended to solidify and drawing off water or aqueous liquid along a line opposite the first-named line, said second line likewise substantially coinciding with a border-line of the ground portion to be acted upon, said ground portion bridging the two said lines, and introducing mineral liquid adapted to become solid on cooling into the ground portion between the lines of introducing and of drawing off the water.

17. Process of producing walls for shafts or tunnels consisting in inclosing the earthy ground which it is intended to solidify for the purpose of forming a solid wall between wall members adapted to carry away heat producing a liquid current between said cooling wall members and introducing a mineral liquid adapted to become solid on cooling into the ground portion inclosed between said cooling wall members and liquid current.

18. Process of producing walls for shafts or tunnels consisting in inserting rows of tubes into the ground at opposite side faces of the walls which it is intended to form, driving water through said tubes, so as to form a liquid current in the ground between the rows of tubes and introducing mineral liquid into the ground inclosed between the tube-rows and the liquid current in the ground.

In testimony whereof I have signed this specification in the presence of two subscribing witnesses.

HERMANN MEHNER.

Witnesses:
HENRY HASPER,
WOLDEMAR HAUPT.